United States Patent [19]

Kramer

[11] Patent Number: 4,842,663
[45] Date of Patent: Jun. 27, 1989

[54] STEAM TURBINE BLADE ANTI-EROSION SHIELD AND METHOD OF TURBINE BLADE REPAIR

[76] Inventor: Leslie D. Kramer, 633 Riverpark Cir., Longwood, Fla. 32779

[21] Appl. No.: 187,850

[22] Filed: Apr. 29, 1988

[51] Int. Cl.⁴ ............................................. B32B 35/00
[52] U.S. Cl. ................................... 156/98; 29/402.11; 29/156.8 B; 156/94; 156/153; 156/247; 156/330; 428/40; 428/63; 428/174; 428/192; 428/416; 428/422
[58] Field of Search ...................... 29/156.8 B, 402.11; 156/94, 98, 247, 153, 330; 428/63, 40, 174, 192, 416, 422

[56] References Cited

U.S. PATENT DOCUMENTS

| | | | |
|---|---|---|---|
| 3,904,101 | 9/1975 | Beltran et al. | 29/156.8 B X |
| 3,928,901 | 12/1975 | Schilling et al. | 29/156.8 B |
| 4,285,108 | 8/1981 | Arrigoni | 29/156.8 B |
| 4,726,101 | 2/1988 | Draghi et al. | 29/402.11 X |

*Primary Examiner*—Robert A. Dawson
*Attorney, Agent, or Firm*—Macdonald J. Wiggins

[57] ABSTRACT

An arcuate anti-erosion shield of stellite or the like has an inner surface with a film supported adhesive attached thereto and gasket strips formed from a fluoroelastomer along the edges thereof. The method of repair of an eroded shield is disclosed in which the eroded shield is removed, welding material dissolved by acid, and the blade sandblasted. The film is removed from the shield and the shield installed on the turbine blade. Pressure and heat is applied to the shield to thermoset the adhesive.

14 Claims, 2 Drawing Sheets

STEAM TURBINE BLADE ANTI-EROSION SHIELD AND METHOD OF TURBINE BLADE REPAIR

BACKGROUND OF THE INVENTION

1. Field of the Invention

The present invention relates to repair of turbine blades having an eroded leading edge thereof, and more particularly to a method and apparatus for in situ repair of such blades.

This method is also applicable to initial manufacture of blades since it eliminates expensive silver solder in some cases and restrengthening after brazing.

2. Description of the Prior Art

It is known in the prior art to provide anti-erosion shields for attachment to the leading edges of steam turbine blades used in the final low pressure stages of steam turbines. The purpose of such shields is to reduce the wear on the blades due to cavitation erosion from condensed water particles contained in the steam. A commonly used material for such anti-erosion shields is a Co-W alloy steel known as Stellite ® 6B. Stellite ® is the trade name of a group of nonferrous alloys in which the hardness is an inherent property of the alloy and is not induced by heat treatment. In some designs, the anti-erosion shield is attached to a recess in the turbine blade by a joining method welding such as brazing, silver soldering, or electron beam welding or by direct welding of the stellite to the blade leading edge. Other designs use a turbine blade having a hardened leading edge. Although high welding or brazing temperatures may cause distortion during manufacture of the blades, any deformation due to such stresses can be controlled or corrected. For example, some blades are forged after attachment of the shield.

Although anti-erosion shields retard wear of the turbine blades, the first blades in a group often eventually experience preferential wear from water droplets sufficient to seriously reduce the life of these components and the wear leads to reduced turbine efficiency. In the past, it has been necessary to remove the worn blades, weld replacement shield material to the blades, and rework the blades to correct distortions caused by the repair. Such repairs are expensive and time consuming and in some instances, a blade must be replaced.

There is a need for a method of repair in which the anti-erosion shield can be replaced in situ without exposing the blade to high temperatures which could cause distortion. Such a method is also needed for use in initial manufacture to eliminate expensive brazing or welding consumables and distortions due to heat of welding.

SUMMARY OF THE INVENTION

The present invention utilizes a preformed anti-erosion shield of suitable metal, such as stellite. In one embodiment of the invention, the shield is custom formed to the approximate profile of the blade to be repaired and to fit into the recess in the blade. The repair shield can be tailored to match any turbine manufacturer's blade design. The surface of the shield which will contact the turbine blade has a sheet of thermosetting, nonvolatile, modified epoxy film adhesive attached thereto. The shield is supplied with a protective film on the exposed adhesive surface. Structural adhesive films, such as AF-3109-2, available from 3M Company under the trade name Scotch-Weld Brand are eminently suitable or HT424 available from the American Cyanamid Company. An epoxy phenolic material meeting the requirements of Federal Specification MMM-A-132, Types III or IV is satisfactory. Edge surfaces of the shield are provided with strips of gasket material of a fluoroelastomer such as Fluorel ® FT-2350, available from 3M Company. A suitable gasket material is one formed from a copolymer or vinylidene fluoride and chlorotrifluoroethylene.

For a repair in which only the original anti-erosion shield is eroded and not the blade material, the remainder of the shield is removed from the blade recess by dissolving the brazing with nitric acid. The recess is then sandblasted and cleaned. A repair shield of the invention of the proper shape and size to fit within the blade recess is prepared by removing the protective film therefrom. The repair shield is placed in the recess and clamped by a suitable jig. Pressure in the range of 50 to 200 psi is applied by the jig. Heating elements in the jig are used to raise the temperature to a value in the range of 300° F. to 400° F. The specific pressure and temperature required is determined from the specifications of the particular adhesive used. Typically, bonding can be accomplished by heating the repair shield and blade to 350° F. for one hour with 150 psi pressure.

After curing of the adhesive, the repair shield is ground to the original blade contour. As will be understood, the entire repair operation can be performed in situ.

Advantageously, the method of the invention avoids the high risks of prior art repairs, such as warping of the blades during the rewelding cycle, possible cracking of the weld or the shield, and the difficulty in controlling the quality of the repair procedure. Highly skilled operators are not needed and long down times are avoided.

It is therefore a principal object of the invention to provide repair of eroded final stage steam turbine blades in situ without welding by use of a replacement anti-erosion shield which is bonded to the blade by means of a thermosetting film adhesive.

It is another object of the invention to provide a repair anti-erosion shield formed of Stellite ® or the like having a thermosetting film adhesive, and fluoroelastomer gaskets in place for installing in the anti-erosion shield recess of a steam turbine blade.

It is yet another object of the invention to provide a method of repairing eroded anti-erosion shields of steam turbine blades without removal of the blades and without welding.

These and other objects and advantages of the invention will become apparent from the following detailed description when read in conjunction with the drawings.

DETAILED DESCRIPTION OF THE PREFERRED EMBODIMENT

Figure 1:
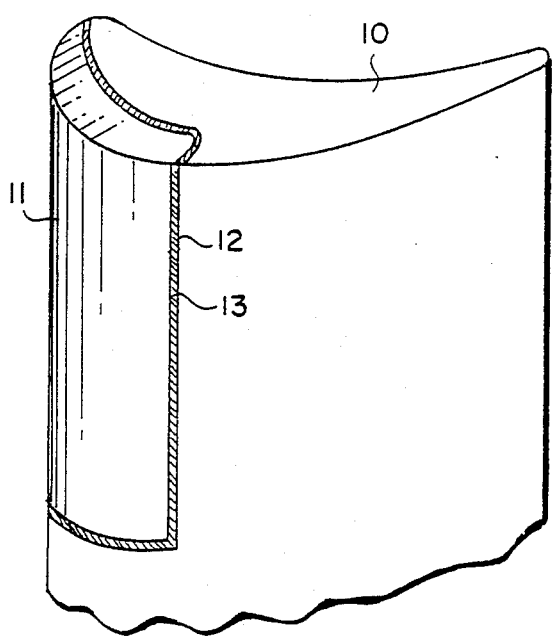
FIG. 1 is a perspective view of a prior art anti-erosion shield construction typical of Westinghouse Corporation steam turbine blades.
Figure 2:
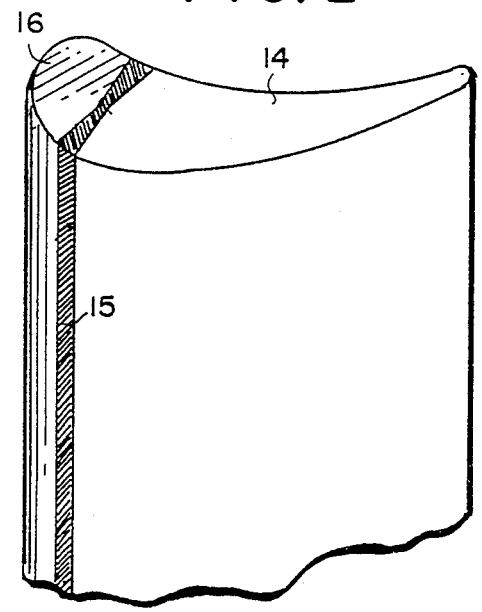
FIG. 2 is a perspective view of a prior art anti-erosion shield construction typical of General Electric Company steam turbine blades.

The low pressure, final stage of a steam turbine operates at temperatures in the range of 40°-150° F. Condensation in the steam can occur causing water droplets to impinge on the leading edges of the turbine blades which are moving at high velocity. This action tends to erode the metal from the blades. To extend the life of the blades, manufacturers reinforce the vulnerable areas with hardened materials such as Stellite ®. FIG. 1 and 2 show typical techniques in current use. Westinghouse Corporation adds a Stellite ® anti-erosion shield 11 attached to a recess 12 in blade 10, as shown in FIG. 1. The shield 11 is bonded by brazing or similar welding. FIG. 2 illustrates the technique used by General Electric Company. A Stellite ® anti-erosion shield 16 is welded to blade 14 producing a seam 15. Although the life of a steam turbine blade is extended by the use of an anti-erosion shield, the hardened material will nevertheless erode to a point that the efficiency of the blade will be reduced.

Figure 3:
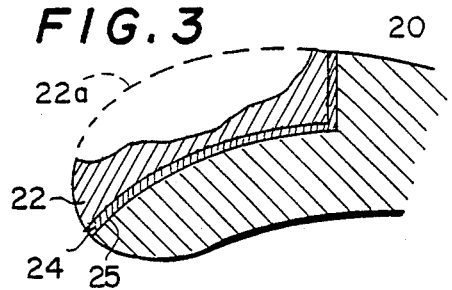
FIG. 3 is a cross-sectional view of the anti-erosion shield and turbine blade of the type of FIG. 1 in which the shield is partially eroded.
Figure 4:
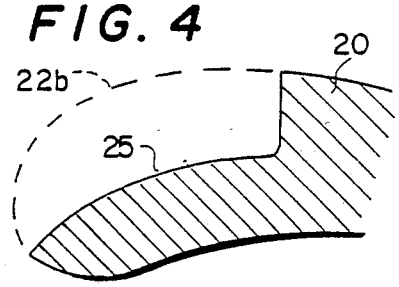
FIG. 4 shows the blade of FIG. 3 in which the shield and weld has been removed preparatory to repair of the shield.

FIG. 3 shows a cross sectional view of the leading edge of a Westinghouse type turbine blade 20 having an anti-erosion shield 22 eroded from the original contour 22a. Original shield 22 was brazed in recess 25 by brazing material 24. The method of repair of blade 20 will be described with reference to FIGS. 4 through 7.

Figure 7:
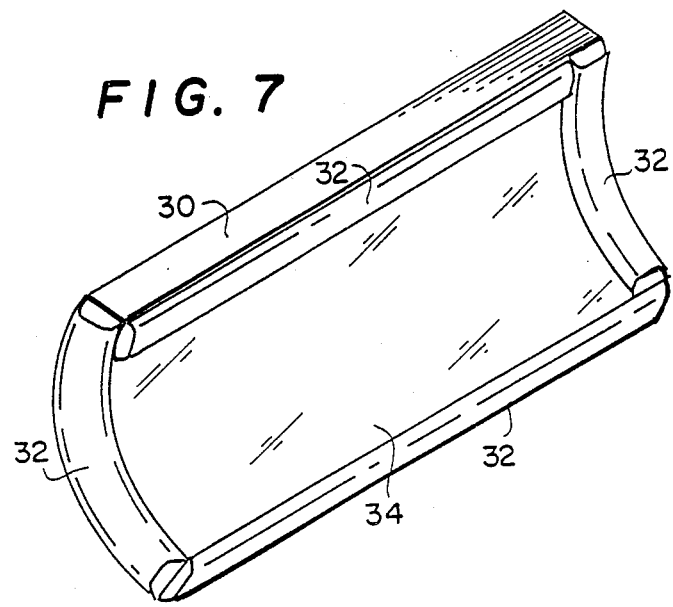
FIG. 7 is a perspective view of a typical repair anti-erosion shield of the invention prior to installation.

FIG. 7 is a perspective view of a repair anti-erosion shield 30 formed from Stellite ® or similar hardened material. A preferred type of Stellite ® may have the composition of 33% chromium, 55% cobalt and 6% tungsten. The shape and size of shield 30 is selected with a length and curvature to fit recess 25 of the turbine blade to be repaired. The thickness and width are selected to be slightly greater than the contour 22b to permit trimming after installation although the shield may have the exact size to eliminate trimming. A structural adhesive film 34 is used to adhere the shield 30 to blade 20 in recess 25. Thermosetting adhesive films of the modified epoxy type are available from the 3M Company or American Cyanimide Company as mentioned above. Such epoxy phenolics, as previously defined, are available in film form with a glass-cloth scrim support and as one-part pastes. These materials cure at low temperatures in the range of 300° F. to 400° F. and have sufficient strength to withstand the forces on the turbine blades.

Figure 5:
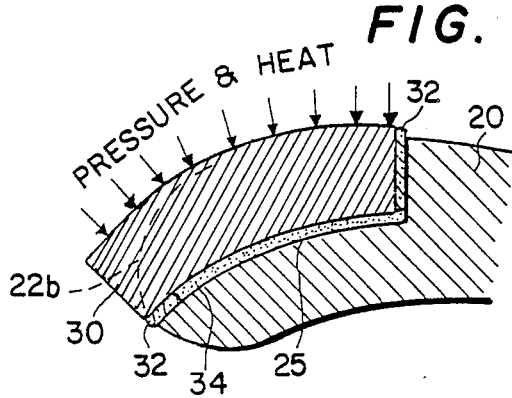
FIG. 5 shows the blade of FIG. 4 in which a repair anti-erosion shield has been installed, and which illustrates the curing method.

In FIG. 7, a sheet of adhesive film 34 has had the film stripped from one surface thereof and has been applied to the inner contour of shield 30. To protect the adhesive 34 after curing, gasketing along the edges is necessary. Gaskets 32 may be formed from a fluoroelastomer material such as Fluorel ® FT-235 discussed above or other fluoropolymer materials. To repair blade 20 of FIG. 3, the eroded shield 22 and welding material 24 must be removed. Brazing material 24 may be dissolved using nitric acid with recess 25 thereafter sand blasted and thoroughly cleaned. In FIG. 5, shield 7 has had the protective film removed from the exposed surface of adhesive 34 and installed in recess 25. After completion of the repair, gaskets 32 will be exposed to the steam, protecting adhesive 34. As indicated in FIG. 5, it is necessary to apply pressure and heat to cure adhesive 34. The required pressure, temperature and curing time will be determined by the specific film adhesive used. Typical pressures are 150 psi and typical temperatures used are in the range of 300° F. to 400° F.

Figure 6:
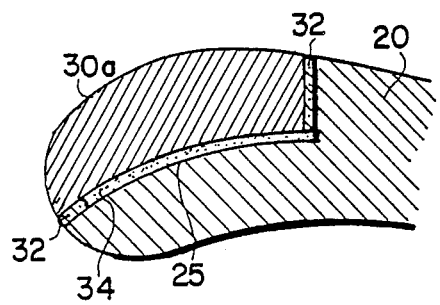
FIG. 6 shows the blade of FIG. 5 in which the film adhesive and gaskets of the repair anti-erosion shield have been cured and the repair shield ground to the proper contour.

Various techniques for applying the required pressure and heat to shield 30 will be apparent to those of skill in the art. After curing of adhesive 34, shield 30 is ground to contour 30a as shown in FIG. 6, completing the repair.

Figure 8:
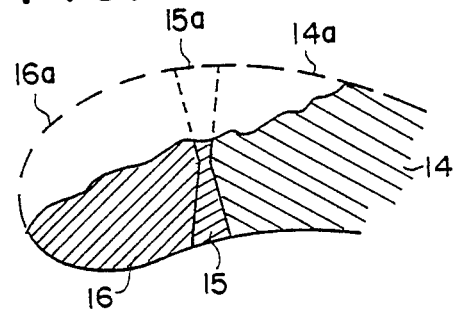
FIG. 8 is a cross sectional view of an anti-erosion shield and blade of the type of FIG. 2 in which a portion of the shield, weld and blade has eroded.
Figure 9:
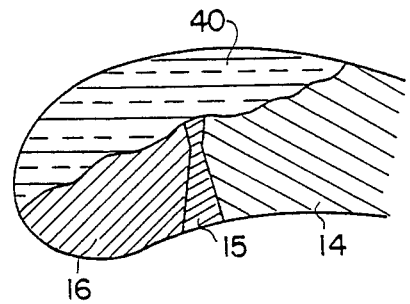
FIG. 9 shows the blade of FIG. 8 in which the eroded material has been replaced by a high temperature epoxy.
Figure 10:
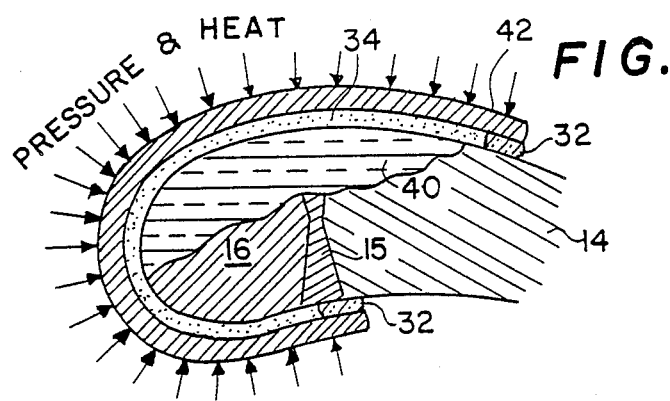
FIG. 10 shows the blade of FIG. 9 in which a wrap around type repair anti-erosion shield in accordance with the invention has been installed, and which illustrates the curing method.

FIGS. 8-10 illustrate repair of a General Electric type turbine blade. In some instances, the leading edge of a blade 14 will erode as indicated in FIG. 8 with portions of Stellite ® anti-erosion shield 16, weld material 15, and blade 14 eroded away. FIG. 9 illustrates the initial step of building up the missing material utilizing an epoxy 40 which is contoured to match the original blade. To protect the epoxy from the low temperature steam, a wrap-around shield 42 is fabricated having an inside contour which will extend over epoxy 40 and around the blade 14 as shown in cross section in FIG. 10. Film supported adhesive 34 and gaskets 32 as previously described are used as shown. Pressure and heat are provided to cure adhesive 34 and to seal gaskets 32. When this type of repair is made on one turbine blade, it will also be necessary to repair the blade 180° away such that dynamic balance will be maintained.

As will now be recognized, a method has been disclosed for repairing, in situ, an eroded steam turbine blade without subjecting the blade to thermal stresses occasioned by welding. The steps of the method basically involve:

(a) removing the remainder of the original anti-erosion shield;

(b) removing original anti-erosion shield welding material;

(c) providing a repair anti-erosion shield having
  (i) a film supported adhesive disposed on the surface of the repair anti erosion shield to be attached to the turbine blade, and
  (ii) fluoropolymer gaskets disposed along edges of the repair anti-erosion shield;

(d) installing the repair anti-erosion shield after removing the protective film therefrom; and (e) curing the adhesive.

Although specific examples have been presented for the apparatus and method of the invention, various modifications thereof may be made without departing from the spirit and scope of the invention.

I claim:

1. An anti-erosion shield for a steam turbine blade comprising:

an accurate shield having an inner surface and an outer surface, and formed of a material substantially more resistant to erosion than said turbine blade;

a plurality of strips of gasket material along edge surfaces of said shield; and said inner surface of said shield having a film supported structural adhesive attached thereto and covering said surface.

2. The shield as recited in claim 1 in which said material is Stellite ® having a composition of 55% cobalt, 33% chromium, and 6% tungsten.

3. The shield as recited in claim 1 in which the curvature of said arcuate shield matches the curvature of a leading edge of said turbine blade.

4. The shield as recited in claim 1 in which said gasket material is a fluoroelastomer.

5. The shield as recited in claim 4 in which said fluoroelastomer is a copolymer of vinylidene fluoride and chlorotrifluorethylene.

6. The shield as recited in claim 1 in which said film supported structural adhesive is a thermosetting, non-volatile, modified epoxy film adhesive.

7. The shield as recited in claim 6 in which said adhesive is an epoxy phenolic in film form with a glass-cloth scrim support.

8. A method of in situ repair of an eroded anti-erosion shield welded to a steam turbine blade comprising the steps of:
(a) removing the remainder of the eroded anti-erosion shield;
(b) removing the eroded shield welding material;
(c) providing a repair anti-erosion shield having:
  (i) a film supported adhesive disposed on the surface of the repair shield to be attached to the turbine blade, and
  (ii) fluoropolymer gaskets disposed along edge surfaces of the repair shield;
(d) installing the repair shield on the turbine blade after removing the film from said repair shield; and
(e) curing the adhesive.

9. The method as recited in claim 8 in which step (b) includes the steps of:
treating the welding material with nitric acid; and
sandblasting the turbine blade after removal of the welding material.

10. The method as recited in claim 8 in which step (e) includes the steps of:
applying pressure to an outer surface of the repair shield; and
applying heat to the repair shield to thermoset the adhesive.

11. The method as recited in claim 10 in which the applied pressure is in the range of 50 psi to 200 psi; and the applied heat produces a temperature range of 300° F. to 400° F.

12. A method of in situ repair of an anti-erosion shield attached to a steam turbine blade in which said shield and a leading edge of said blade are eroded comprising the steps of:
(a) building up the eroded portion of the shield and blade with epoxy to the original contour thereof;
(b) providing a wrap-around repair anti-erosion shield, of a material substantially more resistant to erosion than the blade, having an inside surface with a film supported adhesive disposed thereon, and having fluoropolymer gaskets disposed along edge surfaces of the repair shield;
(c) installing the repair shield over the built-up epoxy and the leading edge of the blade; and
(d) curing the adhesive.

13. The method as recited in claim 10 in which step c includes the steps of:
applying pressure to an outer surface of the repair shield; and
applying heat to the repair shield to thermoset the adhesive.

14. The method as recited in claim 13 in which the applied pressure is in the range of 50 psi to 200 psi; and the applied heat produces a temperature in the range of 300° F. to 400° F.

* * * * *